W. N. BEST.
CHILD'S VEHICLE.
APPLICATION FILED FEB. 25, 1921.
1,391,165.
Patented Sept. 20, 1921.
2 SHEETS—SHEET 1.
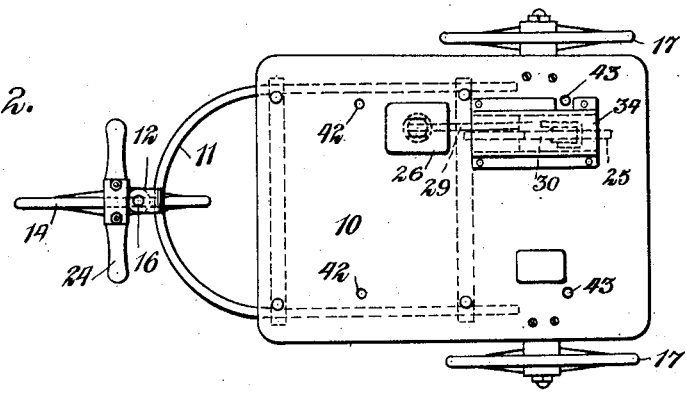
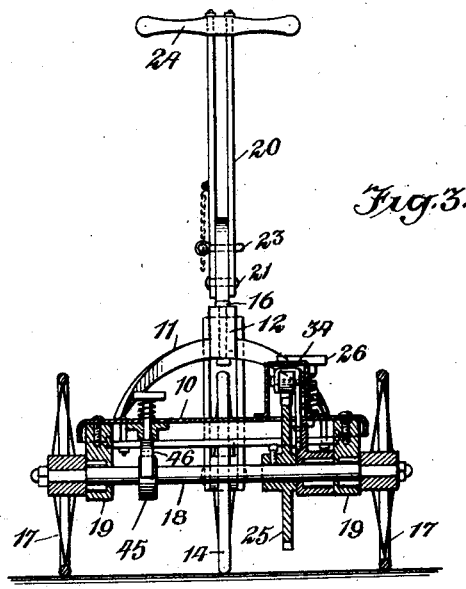
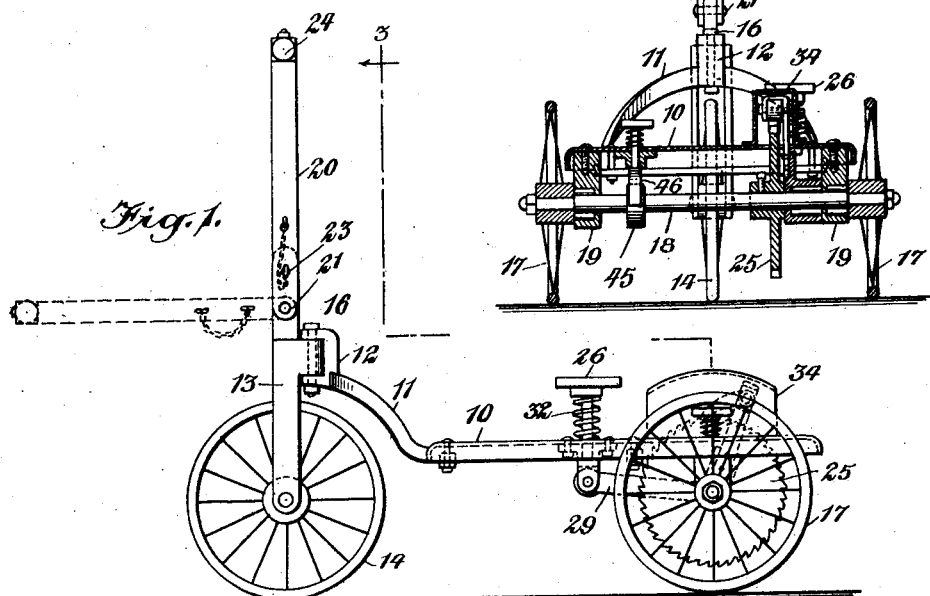
Inventor
William N. Best
By his Attorney

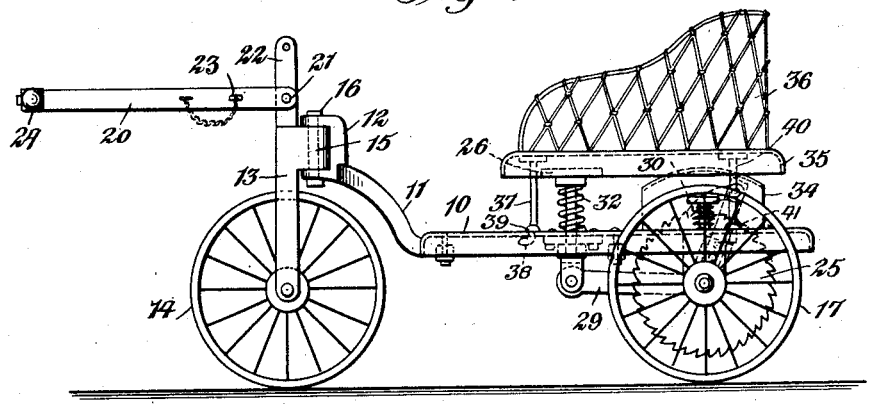
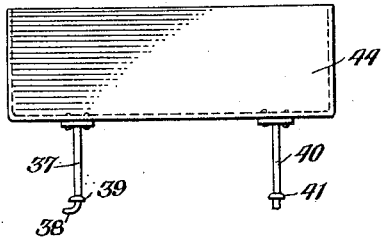
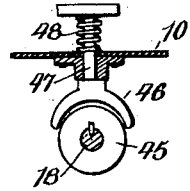
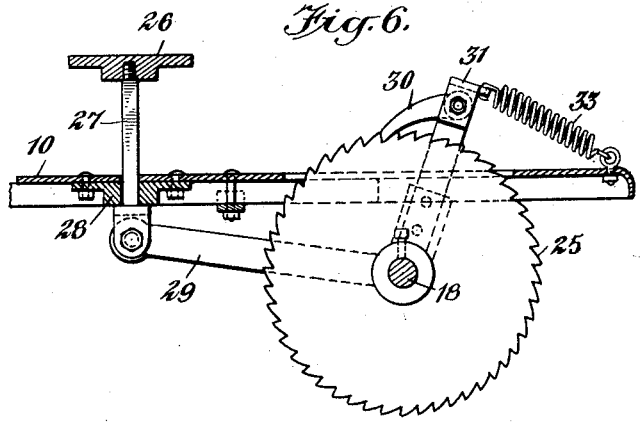

UNITED STATES PATENT OFFICE.

WILLIAM N. BEST, OF BROOKLYN, NEW YORK, ASSIGNOR OF ONE-FOURTH TO GEORGE B. PHELPS, OF NEW YORK, N. Y., ONE-FOURTH TO SARAH A. MEISSER, OF QUINCY, ILLINOIS, AND ONE-FOURTH TO MARGARET STELLA SPIES, OF CRESTON, IOWA.

CHILD'S VEHICLE.

1,391,165.      Specification of Letters Patent.      Patented Sept. 20, 1921.

Application filed February 25, 1921. Serial No. 447,637.

*To all whom it may concern:*

Be it known that I, WILLIAM N. BEST, a citizen of the United States, and resident of Brooklyn, in the county of Kings and State of New York, have invented certain new and useful Improvements in Children's Vehicles, of which the following is a specification.

This invention is an improved child's vehicle, and the main objects of the invention are to facilitate a variety of uses of the vehicle, such, for instance as drawing the child on it, propelling and steering the vehicle by the child standing on it, or using the vehicle for the drawing of small loads of material such as sand.

As one important feature of my improved construction I provide a platform upon which the child may stand, and serving to support a pedal operatively connected to the driving wheel so that the child may propel the vehicle with one foot while standing on the other. As an important feature I provide a body construction which may be detachably secured to the vehicle over the pedal, and propelling means so that the vehicle may be used for drawing a small child. As a further important feature I provide a handle which is pivotally secured to the front wheel carrying frame part and adapted to extend forwardly or rearwardly therefrom or to be locked in a vertical position so as to aid the child in maintaining his balance while standing on the platform and propelling the vehicle by the foot pedal.

In the accompanying drawings:

Figure 1 is a side elevation of my improved construction,

Fig. 2 is a top plan view,

Fig. 3 is a transverse section on the line 3—3 of Fig. 1,

Fig. 4 is a view similar to Fig. 1, but showing the device adapted for drawing a small child, Fig. 5 is a side elevation of an alternately boxed construction, Fig. 6 is an enlarged view showing alternative propelling mechanism, and Fig. 7 is a view showing a brake mechanism.

In the specific construction illustrated I provide a platform 10 secured to a frame including a yoke 11 having a king bolt bearing 12 at the front end. A second or front frame bearing 13 carries the front wheel 14 and also has a king bolt bearing 15, so that the frame parts may turn in respect to each other about the king bolt 16 in the guiding or steering of the vehicle. The rear end of the platform is supported by a pair of rear wheels 17 rigidly secured to an axle 18 mounted in bearing block 19 rigidly secured to the underside of the platform. Preferably the rear wheels are rigid with the axle and the latter is mounted in roller bearings in the bearing blocks 19.

For guiding the vehicle I provide a handle 20 which is secured to the front frame member by a pivot pin 21. The said frame member has an upwardly extending projection 22 above this pivot pin, and means are provided for locking the handle rigid with its upwardly extending portions. As shown, the handle is formed of two spaced parallel bars engaging with opposite sides of the projection 22, and a locking bolt 23 is provided which may extend through these parts and an aperture in the upper end of the projection 22 so as to lock the parts rigid, as shown in Figs. 1 and 2. To prevent this bolt from becoming lost I have illustrated it as being connected to the handle by a small chain. The handle at its free end has a transverse hand grip portion 24 to facilitate turning the handle about an axis longitudinal thereof for steering the vehicle when the handle is in vertical position.

Rigidly secured to the rear axle 18 is a ratchet wheel 25 and means are provided for applying power to rotate this ratchet wheel and the rear axle. As shown, I provide a pedal member 26 secured to the upper end of a plunger member 27 guided to move substantially in a vertical direction through the platform and a guiding collar 28. A lever or link member has one end pivotally mounted on the axle and the other end pivotally secured to the lower end of the plunger member 28. Means are provided whereby the downward swinging of the lever 29 causes a pawl to engage the ratchet wheel and rotate the latter. This pawl might be mounted directly on the lever, if desired, but I have illustrated a pawl 30 mouned on an arm 31 rigid with the lever 29 and forming therewith a bell crank construction. The downward movement of the pedal thus gives a forward movement of the pawl along the upper side of the ratchet wheel, rather than a downward movement on the front side. Any suitable spring arrangement may be employed for normally holding the pedal in raised position and returning it to such position after being forced downwardly. This may be a spring 32 encircling the plunger member 27, as shown in Fig. 1, or might be a spring 33 connecting the rear end of the platform with the upper end of the lever 31, as shown in Fig. 6.

If the ratchet wheel and the operating parts (other than the pedal) be of such size and so positioned as to extend above the plane of the platform, I preferably protect and conceal them by a casing 34.

By means of this construction the handle may be locked in vertical position as shown in Fig. 1, and the child while standing on one foot on the platform may apply pressure intermittently to the pedal to propel the vehicle. The vertical handle serves not only for guiding the vehicle, but also gives a rigid standard by means of which the child may maintain his balance.

If it be desired to use the vehicle for a smaller child and to draw it, this may be accomplished by the use of a body such as shown in Fig. 4. This includes a sheet metal seat 35 with back and side portions 36. The seat portion has four supporting legs. The front two, 37, each have a downwardly and forwardly curved projection 38 below the collar or flange 39, as shown particularly in Fig. 5, and the rear two, 40, each having a similar collar 41 with a straight stud portion therebeneath. The platform 10 of the vehicle has a front pair of openings 42 and a rear pair 43, as shown particularly in Fig. 2. In attaching the seat the latter is set up substantially edgewise with the tips of the projection 38 in the openings 42, and the seat is then swung rearwardly and downwardly so that the projections serve as pivots and swing into place while the ends of the rear legs 40 enter the openings 43. With the parts so designed and in position, the seat cannot move laterally, nor can the front end swing up, should the child lean back too far. The only way the seat can be removed is by first lifting the rear end and this movement could not very well take place with the child riding on the seat. The legs 37 and 40 may be of any desired height, but are preferably such as to permit the seat 35 to be above and free from the ratchet wheel casing 34 and the pedal 26. The seat 35 is shorter than the platform 10 so that the child may place his feet on the platform in front of the seat while riding on the latter.

There is also preferably provided a second body such as shown in Fig. 5. This has the same leg construction as the seat 35, but may be a rectangular box 44 formed of sheet metal and in which the child may draw sand, blocks or other material or objects. The sand box body 44 is interchangeable with the seat 35.

The vehicle is thus adapted to be drawn with the parts in the position shown in Fig. 4 or the handle 20 may be swung over through approximately 180° so that the child sitting on the seat 35 may steer it or the handle may be locked in vertical position as shown in Fig. 1, to facilitate steering and supporting the child when he stands on the platform. When used for this purpose it is important that a suitable brake be provided to retard the speed of the vehicle if necessary, and such means is shown particularly in Fig. 7, as including a brake drum 45 and a brake shoe 46. The latter is illustrated as mounted on a plunger member 47 normally held raised by a spring 48. The child by applying pressure to the upper end of the plunger member 47 may apply the brake and bring the vehicle to a quick stop.

Having thus described my invention, what I claim as new and desire to secure by Letters Patent is:

A child's vehicle having front and rear wheels, a platform upon which the child may stand, a steering handle for the front wheel, pivotal connections therefor, whereby a handle may extend forwardly, rearwardly or upwardly, means for locking the handle in its upwardly extending position, whereby the child may use it as a support while standing on the platform, vehicle propelling means including a pedal extending upwardly through said platform which the child may operate with one foot, and a seat of a width substantially equal to that of the platform and detachably secured to the latter for covering and rendering inoperative said pedal when the vehicle is used for drawing the child.

Signed at New York, in the county of New York, and State of New York, this 19th day of February, A. D. 1921.

WILLIAM N. BEST.